(12) United States Patent
Berndt et al.

(10) Patent No.: US 10,449,845 B2
(45) Date of Patent: Oct. 22, 2019

(54) SEALING PROFILE, VEHICLE BODY EQUIPPED WITH SUCH AND METHOD FOR WORKING IT

(71) Applicant: GM GLOBAL TECHNOLOGY OPERATIONS LLC, Detroit, MI (US)

(72) Inventors: Frank-Olaf Berndt, Frankfurt (DE); Marco Will, Montabaur (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 181 days.

(21) Appl. No.: 15/832,398

(22) Filed: Dec. 5, 2017

(65) Prior Publication Data

US 2018/0154751 A1 Jun. 7, 2018

(30) Foreign Application Priority Data

Dec. 7, 2016 (DE) .................. 10 2016 014 606

(51) Int. Cl.
| | |
|---|---|
| *B60J 10/00* | (2016.01) |
| *B60J 10/84* | (2016.01) |
| *B60J 10/35* | (2016.01) |
| *B60J 10/23* | (2016.01) |
| *B60J 10/16* | (2016.01) |
| *B60J 10/82* | (2016.01) |
| *B62D 65/02* | (2006.01) |
| *B62D 29/00* | (2006.01) |

(52) U.S. Cl.
CPC ............... *B60J 10/45* (2016.02); *B60J 10/16* (2016.02); *B60J 10/233* (2016.02); *B60J 10/35* (2016.02); *B60J 10/82* (2016.02); *B60J 10/84* (2016.02); *B62D 29/002* (2013.01); *B62D 65/024* (2013.01)

(58) Field of Classification Search
CPC . B60J 10/45; B60J 10/233; B60J 10/84; B60J 10/35; B60J 10/82; B60J 10/16; B62D 65/024; B62D 29/002
See application file for complete search history.

(56) References Cited

U.S. PATENT DOCUMENTS

2007/0199247 A1* 8/2007 Oba ..................... B60J 10/24
49/498.1

FOREIGN PATENT DOCUMENTS

EP 0021069 A1 * 1/1981 ............ B60J 10/248

* cited by examiner

*Primary Examiner* — D Glenn Dayoan
*Assistant Examiner* — Melissa A Black
(74) *Attorney, Agent, or Firm* — Lorenz & Kopf, LLP

(57) ABSTRACT

A sealing profile includes an elastomer body with a first and a second profile section. The first profile section is harder than the second profile section and has an elongated cross section with an exposed flank. A first plane that is tangential with respect to the exposed flank subdivides the second profile section in the relaxed state into a first and a second sealing region.

15 Claims, 2 Drawing Sheets

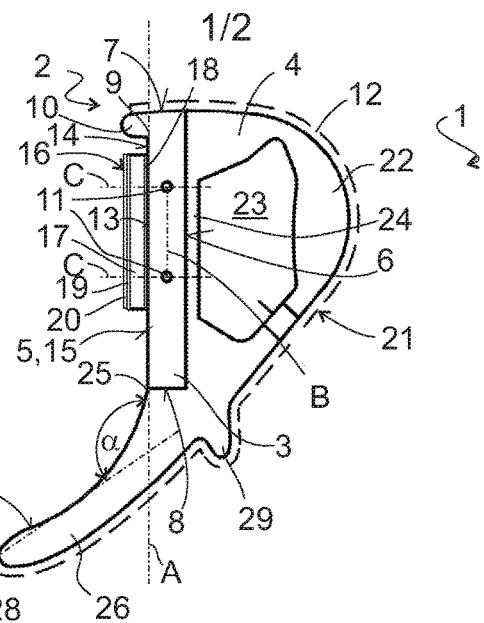
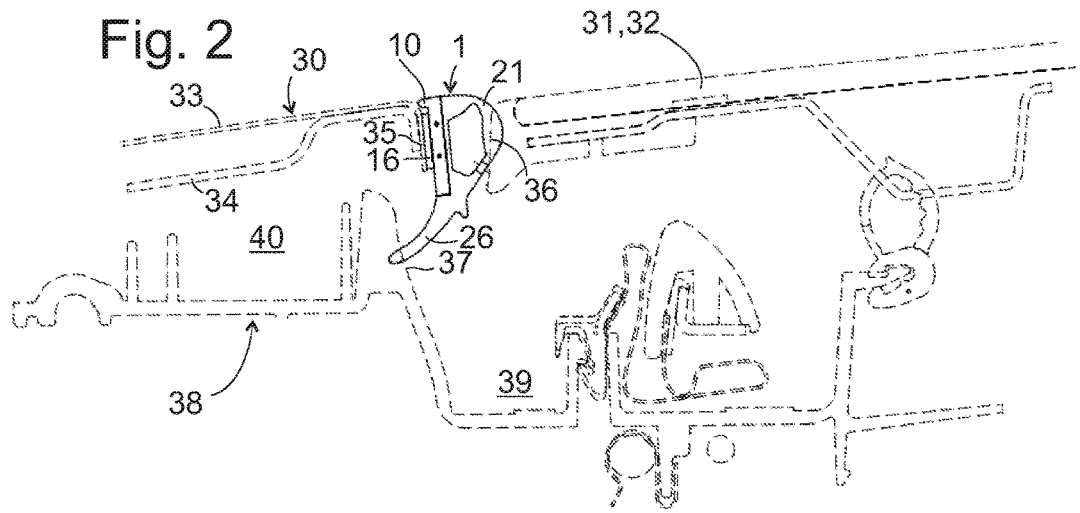
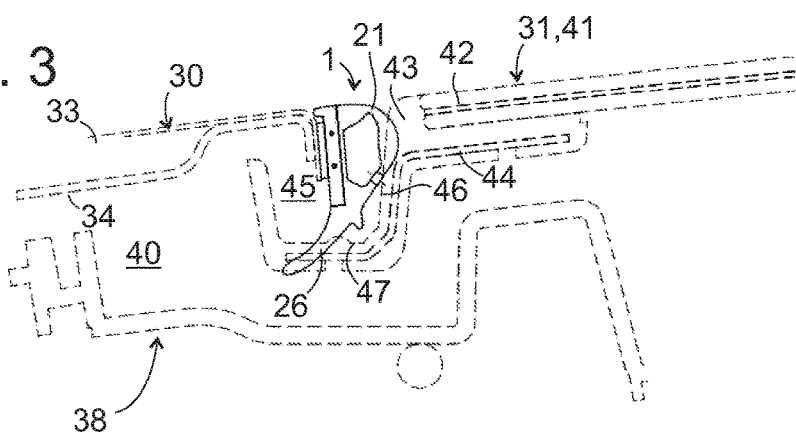

SEALING PROFILE, VEHICLE BODY EQUIPPED WITH SUCH AND METHOD FOR WORKING IT

CROSS-REFERENCE TO RELATED APPLICATION

This application claims priority to German Patent Application No. 102016014606.0, filed Dec. 7, 2016, which is incorporated herein by reference in its entirety.

TECHNICAL FIELD

This application pertains to a seal for a vehicle body having a sealing profile to seal a gap between a first body element such as a door, a tailgate, a roof window or a sliding roof and a second body element such as a frame, which surrounds one of the aforementioned elements, and to a method for working a sealing profile.

BACKGROUND

A sealing profile conventionally used for sealing a gap between a roof window or sliding roof and a roof frame surrounding the roof window or sliding roof includes a first profile section of a relatively hard material and a second profile section of a softer elastomer material. The first profile section functions as a substrate, which is glued to the edge of the roof frame. The second profile section is provided in order to seal in contact with other components of the roof following the installation. In order to obtain a satisfactory sealing effect and an attractive appearance also in the location of the roof frame. The two ends of the sealing profiles lie opposite one another, the ends should preferably include flat cut edges. Producing such flat cut edges proves to be difficult in practice because of the irregular cross-sectional shape and the different resilience of the two profile sections.

Accordingly, there is a need to provide a sealing profile which can be reliably cut with a flat cut edge.

SUMMARY

In accordance with the present disclosure, a sealing profile includes an elastomer body having a first profile section and a second profile section. The first profile section is harder than the second profile section and is limited by an exposed flank with two longitudinal edges extending in a plane. A cross-sectional region of the elastomer body, which projects over the plane on the other side of at least one first of the longitudinal edges, is completely formed by the second profile section. The cross-sectional structure makes it possible to place the sealing profile for cutting onto a flat support so that the exposed flank lies against the support and the projecting cross-sectional region in contact with the support is deformed so that, next to the exposed flank, on the other side of its first longitudinal edge, it likewise lies flat against the support. When now, for the cutting of the sealing profile, a blade is brought through the sealing profile in contact with the support, neither the first profile section nor the projecting cross-sectional region can avoid the blade. For this reason, no part of the cross section of the elastomer body can be dislodged in longitudinal direction prior to the cutting so that a flat, even cut edge is formed.

The present disclosure also provides a method for working a sealing profile including pressing the exposed flank of the projecting cross-sectional region against a flat support, and cutting the sealing profile in that a blade is brought through the sealing profile in contact with the support. In order to favor the pressed-on sealing profile lying flat against the support prior to the cutting, a flank of the projecting cross-sectional region may follow the exposed flank in a flush manner. In an embodiment, a flank of the second profile section following the exposed flank of the first profile section, on the other side of the first longitudinal edge of the same, initially forms a recess receding behind the plane of the flank and again crosses the plane only on the other side of the recess in order to form the cross-sectional region projecting over the plane.

In order to achieve a large-area contact of the elastomer body with the support, the flank of the projecting cross-sectional region is preferably concave, and the cut angle between a tangent of the flank and the plane is the nearer 180° the smaller the distance of a point of the flank of the projecting cross-sectional region touching the tangent is from the exposed flank of the first profile section.

Furthermore, in order to facilitate the projecting cross-sectional region having the support, the projecting cross-sectional region and the first profile section should, seen in a direction that is perpendicular to the exposed flank preferably not overlap so that the projecting cross-sectional region may yield behind the plane unhindered by the stiffer first cross-sectional region.

The second profile section may form a sealing region, in particular for sealing in contact with a window or sliding roof, on a side of the first profile section facing away from the exposed flank.

In order to simplify the production of the elastomer body, in particular by co-extrusion of the two profile sections, the sealing region and the projecting cross-sectional region may be formed together in one piece.

In order to increase its resilience under pressure, the sealing region may delimit a hollow space extending along the elastomer body.

The projecting cross-sectional region, by contrast, is preferably formed free of such a hollow space and instead is formed as a rib, which on a narrow side of its cross section adjoins the first profile section.

The first and the second profile section may include the same elastomer material. In order to make the second profile section softer than the first one, the elastomer material in the second profile section may be a foamed material. A suitable elastomer material may be an ethylene propylene diene monomer rubber (EPDM).

A double sided adhesive tape, which serves for fastening the sealing profile on the first body element, may be attached to the exposed flank of the first profile section.

The double sided adhesive tape may include a foamed substrate. Such a substrate may offset irregularities of a base onto which the elastomer body is bonded for counteracting bending stresses in the interior of the elastomer body. In addition, the foamed substrate may be elastically stretchable so that it can adapt to a stretching or contraction of the elastomer body without tearing or forming creases.

The first profile section may be provided with an insert, the stretchability of which is lower than that of the elastomer material of the first profile section. Such an insert serves for two different objectives. On the one hand, the sealing profile, thanks to the insert, may be kept under tension while tacking-on the adhesive tape so that the first profile section forms a support that has sufficient strength for pressing-on the adhesive tape. On the other hand, the sealing profile may limit the stretching of the sealing profile connected with the exertion of the tension so far that when, following the application of the adhesive tape, the sealing profile is relaxed again, such does not result in creases being formed in the adhesive tape. The insert may also prevent a stretching of the sealing profile during the bonding on the first body element which, when the sealing profile runs along a concave edge of the body element, could result in that the sealing profile relaxes later on through localized detachment of the bond.

In order to effectively limit the ability of the sealing profile, the insert may include fibers, for example glass fibers, extending in the longitudinal direction of the sealing profile.

The insert may include one, and preferably at least two strands. In order for these to effectively limit the stretchability of the surface of the sealing profile covered by the adhesive tape, each strand is preferably arranged so that a surface normal of the adhesive tape exists, which crosses it.

On its second longitudinal edge, the exposed flank may be delimited by a web projecting over the plane. Such a web may serve as a gauge which facilitates attaching the sealing profile to the first body element with correct orientation. In addition, such a web, in that it lies against the first body element itself, may protect the adhesive tape or any other fastening means provided on the exposed flank from the effects of the weather.

The subject of the present disclosure relates to a vehicle body having a first and a second body element, which are exposed on an outside of the body and are spaced by a gap, wherein the gap is filled out by a sealing profile as described above. When the sealing profile is bonded to the first body element, the sealing region should touch the second body element.

Preferably, the first body element includes an aperture in which the second body element is arranged. When the sealing profile is bonded to the first body element about the aperture, the limitation of the stretchability of the sealing profile by the insert is helpful in order to ensure that the sealing profile, during the bonding, is not stretched so excessively that, because of its internal stress, it disengages again from the first body element later on.

Furthermore, the vehicle body may include a third body element located inside, against which lies the projecting cross-sectional region, bridging an intermediate space between the first and the third body element. When the first body element, to which the sealing profile is bonded, forms the edge of an aperture, in which the second body element is arranged, the sealing profile remains in place when the second body element is moved in order for example to open the roof of the vehicle body and the contact of the sealing profile with the third body element remains intact regardless of the movement of the second body element.

BRIEF DESCRIPTION OF THE DRAWINGS

The present disclosure will hereinafter be described in conjunction with the following drawing figures, wherein like numerals denote like elements.

FIG. 1 is a cross section of the sealing profile

FIG. 2 shows an extract from a roof of a vehicle body with a sliding roof sealed by the sealing profile in cross section;

FIG. 3 is a cross section of a roof analogous to FIG. 2 with a roof window sealed by the sealing profile;

DETAILED DESCRIPTION

Figure 4:
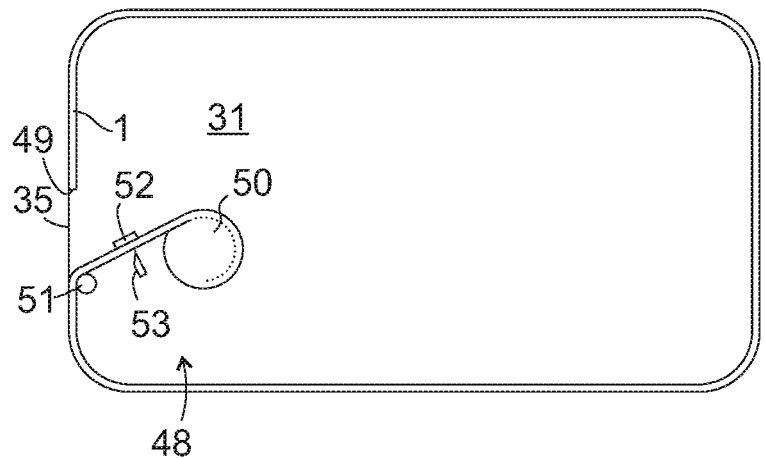
FIG. 4 is a plan view of a vehicle roof with a roof aperture, on the edge of which the sealing profile of FIG. 1 is mounted over a part of its length.

The following detailed description is merely exemplary in nature and is not intended to limit the invention or the application and uses of the invention. Furthermore, there is no intention to be bound by any theory presented in the preceding background of the invention or the following detailed description.

FIG. 1 shows the sealing profile 1 according to the present disclosure in cross section. The cross section includes an elastomer body 2 with two profile sections 3, 4 of different hardness. The profile sections 3, 4 may be extruded separately from one another and subsequently joined to form the elastomer body 2; preferably, they are co-extruded.

The profile section 3 includes a solid (i.e., not foamed) elastomer body, for example of EPDM with a hardness of 80 Shore A. The profile section 3, here in the form of a strip, defines two wide flanks (or major faces) 5, 6 and two narrow flanks (or minor faces) 7, 8 in cross-section as seen in FIG. 1. The major face or wide flank 6 and minor face or narrow flank 8 are covered by the profile section 4. The major face or wide flank 5 and minor face or narrow flank 7 are exposed on the surface of the elastomer body 2. The flank 5 runs flat in a plane designated A. At an upper longitudinal edge 9 of the flank 5, a web 10 projects over the plane A. As shown in FIG. 1, the web 10 may be part of the solid profile section 3 but may also belong to the profile section 4.

Two inserts 11 of glass fiber, here in the form of cords, are embedded in the profile section 3. The inserts 11 run in a straight line and perpendicularly to the cut plane of FIG. 1. Although the elastomer material of the profile section 3 is elastically stretchable per se, the embedded inserts 11 prevent a longitudinal stretching of the elastomer body 2 under tensile loading. They merely allow bends and favor in particular bends of the elastomer body 2 about an axis which runs parallel to a straight line B connecting the inserts 11 in the cut plane.

The inserts 11 run "behind" the flank in the sense that regarding each insert 11 there exists a surface normal C of the flank 5 which crosses said insert 11. The surface normal C divide the flank 5 into a central section 13 and to edge sections 14, 15. A double sided adhesive tape 16 adheres to the flank 5 and thereby covers the central section 13 and parts of the edge sections 14, 15.

The adhesive tape 16 has a substrate 17 of foamed rubber which is provided with adhesive layers 18, 19 on both sides. The layer 18 connects the substrate 17 to the flank 5. The other layer 19 may be lined with a protective film 20 prior to usage.

The profile section 4 may be formed with the same elastomer as the profile section 3, the elastomer material in the profile section 4 being a foamed material and therefore softer than in the profile section 3. A sealing region 21 of the profile section 4 includes a wall 22, which, starting out from an edge of the flank 6, extends in an arch about a hollow space 23 to the opposite edge of the flank 6 and the flank 8; for production reasons, a further wall 24 lying against the flank 6 may be provided so that the hollow space 23 is surrounded all round by the profile section 4.

On the other side of a lower longitudinal edge 25, the flank 5 of the profile section 3 is extended flush by a flank 27 of a cross-sectional region 26 of the profile section 4 projecting over plane A. The cross-sectional region 26 has the form of a rib which, with a narrow side of its cross section, adjoins the profile section 3 and the wall 22. The flank 27 is concavely curved. Plane D that is tangential with respect to the flank 27 and plane A bisect one another at an obtuse angle α. The angle α deviates from the 180° by an amount that is the smaller the nearer the point, at which the plane D touches the flank 27, lies on the longitudinal edge 25. In other words, cross-sectional region 26 has a concaved surface 27 with respect to the first major face 5 such that a cut angle α defined between a tangent D at a point of tangency on the concaved surface 27 and the plane A approaches 180° as the point of tangency approaches the first longitudinal edge 25.

A low-friction coating may extend over a large part of the surface of the elastomer body 2, here from the flank 7 over the wall 22 of the sealing region 21 as far as to a distil tip 28 of the cross-sectional region 26.

Between the two sealing regions 20, 24, a drip edge 29 may be provided.

FIG. 2 shows an extract from a roof of a vehicle body. A roof frame 30 surrounds an aperture 31, which in the closed position shown in FIG. 2 is largely filled out by a sliding roof 32. Roof frame 30 and sliding roof 32 form two body elements which are exposed on the outer skin of the body.

The roof frame 30 in this case includes an outer skin panel 33 and a beam 34 located below, which supports the outer skin panel 33 in particular along the edge of the aperture 31. An edge region of the outer skin panel 33 is angled towards the vehicle interior in order to form a flange 35 extending around the aperture 31 and orientated approximately perpendicularly to the top side of the roof. A gap extends between the flange 35 and an edge 36 of the sliding roof 32. The sealing profile 1 fills out the gap in that the adhesive tape 15 adheres to the flange 35 and the sealing region 21 lies against the edge 36 of the sliding roof 32.

As in FIG. 1, FIG. 2 shows the cross section of the sealing profile 1 in the relaxed state which is why the sealing region 21 appears to overlap the edge 36; in reality, it is compressed between the edge 36 and the flange 35.

The cross-sectional region 25 projects over the lower edge of the flange 35 into the interior of the roof and lies against a steep flank 37 of a third body part, here designated as roof substructure 38, concealed in the interior of the body. Here, the overlap between the cross-sectional region 26 and the flank 37 indicates that the cross-sectional region 26 in reality is elastically deflected by the contact with the flank 37.

Under the sealing profile 1 a water drainage channel 39 is formed in the roof substructure 38 in order to collect and discharge water which—for example in a partly open position of the sliding roof 32—runs through between the edge 36 and the sealing profile 1. The cross-sectional region 26 blocks an intermediate space 40 between the flange 35 and the roof substructure 38 so that, even when the sliding roof 32 is open, neither headwind nor precipitation may enter the intermediate space 40.

By the web 10 lying against the flange 35 above the adhesive tape 16 it protects the same from the effects of the weather.

FIG. 3 shows a second cross section through a vehicle roof. The roof frame 30, its flange 33 angled at the edge of the aperture 31 and the sealing profile 1 bonded to the same are similar to those of FIG. 2. Here, the aperture 31 is filled out by fixed roof window 41. The roof window 41 includes a window pane 42 and a window frame 43 extending around the window pane 42. The window frame 43 may be a molded body made of plastic injection-molded onto the window pane 41 possibly reinforced by a metal insert 44 locally.

A water drainage channel 45 is formed here as an integral part of the window frame 43. The sealing region 21 lies against a sidewall 46, the cross-sectional region 26 against a base 47 of the water drainage channel 44.

FIG. 4 shows a plan view of the roof frame 30 and its aperture 31 during the assembly of the vehicle prior to the installation of the sliding roof 32 or the roof window 41. With the help of an application tool 48, the sealing profile 1, starting out from a first cut edge 49, is bonded-on along a major part of the flange 35. The application tool 48 includes a storage reel 50, from which the sealing profile 1 is unwound, a pressure roller 51, which is moved along the edge of the aperture 31 in order to press the adhesive tape of the sealing profile 1 against the flange 35, and, between the storage reel 50 and the pressure roller 51, a cutting support 52 and a blade 53. The blade 53 is provided in order to cut the sealing profile 1 exactly in the length so that a second cut edge obtained during the cutting comes to lie against the flange 35 in contact with the cut edge 49.

Figure 5:
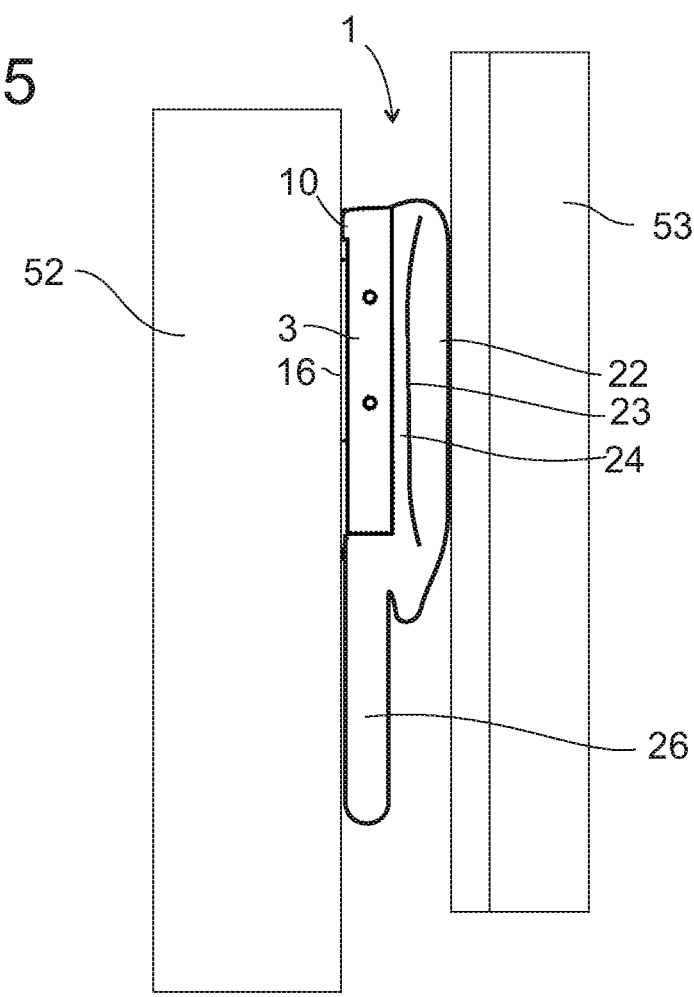
FIG. 5 shows the sealing profile compressed between a support and a blade.

FIG. 5 schematically shows the sealing profile 1 which is clamped in between the cutting support 52 and the blade 53 immediately prior to the start of the cutting. By way of the pressure of the blade 53 the hollow space 23 is compressed; the walls 22, 24 are supported relative to the blade 53 by the profile section 3. The web 10 is flattened so that the profile section 3, via the likewise compressed adhesive tape 16, lies against the cutting support 52 over a large area. Since the walls 22, 24 cannot avoid the blade 53 they are cut smoothly and without tearing. When the walls 22, 24 have been cut, the blade 53 reaches the profile section 3 and the cross-sectional region 26 which likewise lies flat against the cutting support 52; these cannot avoid the pressure of the blade 53 in any direction either and are cut smoothly. Accordingly, two cut edges are created of which the one comes to lie against the already existing cut edge 49.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A sealing profile for a vehicle to seal a gap between a first body element and a second body element surrounding the first body elements, the sealing profile comprising an elastomer body having a first profile section delimited by a first major face defining a plane and having first and second longitudinal edges and a second major face opposite the first major face, and a second profile section forming a cross-sectional region of the elastomer body, which projects over the plane in a direction from the second major face to the first major face and adjacent the first longitudinal edge, wherein the first profile section is harder than the second profile section.

2. The sealing profile according to claim 1, wherein a flank of the cross-sectional region adjoins the first major face at the first longitudinal edge in a flush manner.

3. The sealing profile according to claim 2, wherein the flank of the cross-sectional region has a concaved surface with respect to the first major face such that a cut angle defined between a tangent at a point of tangency on the concave surface of the flank and the plane approaches 180° as the point of tangency approaches the first longitudinal edge.

4. The sealing profile according to claim 3, wherein the cross-sectional region and the first profile section do not overlap as seen in a direction that is perpendicularly to the first major face.

5. The sealing profile according to claim 4, wherein the second profile section forms a sealing region on the second major face.

6. The sealing profile according to claim 5, wherein the sealing region and the cross-sectional region are formed in one piece with one another.

7. The sealing profile according to claim 5, wherein the sealing region delimits a hollow space extending along the elastomer body.

8. The sealing profile according to claim 1, wherein the cross-sectional region comprises as a rib, which at a narrow side of its cross section adjoins the first profile section.

9. The sealing profile according to claim 1, wherein the first profile section and the second profile section comprise the same elastomer material, wherein the elastomer material in the second profile section is a foamed elastomer material.

10. The sealing profile according to claim 1, further comprising an insert disposed in the first profile section, wherein a stretchability of the insert is less than a stretchability of the first profile section.

11. The sealing profile according to claim 10, wherein the insert comprises at least one fibre extending in a longitudinal direction of the sealing profile.

12. The sealing profile according to claim 1, wherein the first major face is delimited at the second longitudinal edge by a web projecting over the plane.

13. A vehicle body comprising:
a first body element;
a second body element spaced apart from the first body element and defining a gap therebetween;
a seal at least partially disposed over the gap and secured to the second body, the seal including an elastomer body having a first profile section delimited by a first major face defining a plane and having first and second longitudinal edges and a second major face opposite the first major face, and a second profile section forming a cross-sectional region of the elastomer body, which projects over the plane in a direction from the second major face to the first major face and adjacent the first longitudinal edge, wherein the first profile section is harder than the second profile section.

14. The vehicle body according to claim 13, further comprising a third body element located inside, wherein the second profile section abuts the third body element and bridges an intermediate space between the first body element and the third body element.

15. A method for working a sealing profile to a vehicle body component comprising:
providing a sealing profile including an elastomer body having a first profile section delimited by a first major face defining a plane and having first and second longitudinal edges and a second major face opposite the first major face, and a second profile section forming a cross-sectional region of the elastomer body, which projects over the plane in a direction from the second major face to the first major face and adjacent the first longitudinal edge, wherein the first profile section is harder than the second profile section;
pressing the first major face against a flat support; and
cutting the sealing profile by bringing a blade into contact with the support through the sealing profile.

* * * * *